(12) United States Patent
Tanaka

(10) Patent No.: US 8,327,252 B2
(45) Date of Patent: Dec. 4, 2012

(54) DATA RECEIVING APPARATUS, DATA RECEIVING METHOD, AND COMPUTER-READABLE RECORDING MEDIUM

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 817 days.

(21) Appl. No.: 12/491,073

(22) Filed: Jun. 24, 2009

(65) Prior Publication Data

US 2010/0115387 A1 May 6, 2010

(30) Foreign Application Priority Data

Oct. 30, 2008 (JP) ................................. 2008-280196

(51) Int. Cl.
*H03M 13/05* (2006.01)
*G06F 11/10* (2006.01)
(52) U.S. Cl. ...................................................... 714/807
(58) Field of Classification Search .................. 714/807
See application file for complete search history.

(56) References Cited

U.S. PATENT DOCUMENTS

| | | | | |
|---|---|---|---|---|
| 5,274,631 A | * | 12/1993 | Bhardwaj | 370/401 |
| 5,303,237 A | * | 4/1994 | Bergman et al. | 370/418 |
| 5,307,345 A | * | 4/1994 | Lozowick et al. | 370/428 |
| 5,347,450 A | * | 9/1994 | Nugent | 709/243 |
| 5,412,782 A | * | 5/1995 | Hausman et al. | 709/250 |
| 5,448,564 A | * | 9/1995 | Thor | 370/392 |
| 5,566,170 A | * | 10/1996 | Bakke et al. | 370/392 |
| 5,617,419 A | * | 4/1997 | Christensen et al. | 370/471 |
| 5,633,865 A | * | 5/1997 | Short | 370/412 |
| 5,651,002 A | * | 7/1997 | Van Seters et al. | 370/392 |
| 5,826,032 A | * | 10/1998 | Finn et al. | 709/236 |
| 5,845,085 A | * | 12/1998 | Gulick | 709/236 |
| 5,872,920 A | * | 2/1999 | Hausman et al. | 709/250 |
| 6,115,387 A | * | 9/2000 | Egbert et al. | 370/423 |
| 6,144,668 A | * | 11/2000 | Bass et al. | 370/401 |

(Continued)

FOREIGN PATENT DOCUMENTS

JP 2008-146486 6/2008

OTHER PUBLICATIONS

Tanaka, U.S. Appl. No. 12/404,616, filed Mar. 16, 2009, entitled "Data Receiving Apparatus, Data Receiving Method, and Program Storage Medium".

(Continued)

*Primary Examiner* — Stephen M Baker
(74) *Attorney, Agent, or Firm* — Finnegan, Henderson, Farabow, Garrett & Dunner, L.L.P.

(57) ABSTRACT

A data receiving apparatus includes: a header analyzing unit that analyzes a header of a frame and outputs header information; a checksum judging unit that calculates and judges a checksum of the frame; a buffer unit that stores a data portion of the frame; a reading unit that reads connection information corresponding to the header information from a second storage unit; an identifying unit that identifies a write location for the data portion based on the connection information; a data writing unit that reads data from the buffer unit and starts writing the data to the identified write location in a first storage unit before the checksum is judged; and a writing unit that, if the judgment result is "pass," writes the connection information updated based on the header information to the second storage unit while the data writing unit is writing.

13 Claims, 12 Drawing Sheets

U.S. PATENT DOCUMENTS

| | | | | |
|---|---|---|---|---|
| 6,151,316 | A * | 11/2000 | Crayford et al. | 370/356 |
| 6,400,715 | B1 * | 6/2002 | Beaudoin et al. | 370/392 |
| 6,522,656 | B1 * | 2/2003 | Gridley | 370/428 |
| 6,594,278 | B1 * | 7/2003 | Baroudi | 370/466 |
| 6,738,384 | B1 * | 5/2004 | Chung | 370/412 |
| 7,100,102 | B2 * | 8/2006 | Hooper et al. | 714/758 |
| 7,219,294 | B2 * | 5/2007 | Vogt | 714/758 |
| 7,251,704 | B2 * | 7/2007 | Solomon et al. | 710/316 |
| 7,649,912 | B2 * | 1/2010 | Balasubramanian et al. | 370/509 |
| 7,840,873 | B2 * | 11/2010 | Hughes et al. | 714/758 |
| 7,908,540 | B2 * | 3/2011 | Jeong et al. | 714/758 |
| 7,979,588 | B1 * | 7/2011 | Tran et al. | 709/253 |
| 2007/0198900 | A1 * | 8/2007 | Ryu et al. | 714/776 |

OTHER PUBLICATIONS

Hasegawa, "Performance Evaluation of Hardware TCP-NIC (TCP Offload Engine), TCP Operating Analysis, and Consideration Thereof," Network Architecture (May 23, 2003), pp. 1-17, and English-language translation thereof.

* cited by examiner

DATA RECEIVING APPARATUS, DATA RECEIVING METHOD, AND COMPUTER-READABLE RECORDING MEDIUM

CROSS REFERENCE TO RELATED APPLICATION

This application is based upon and claims benefit of priority from the Japanese Patent Application No. 2008-280196, filed on Oct. 30, 2008, the entire contents of which are incorporated herein by reference.

BACKGROUND OF THE INVENTION

The present invention relates to a data receiving apparatuses, a data receiving methods, and a computer-readable recording media.

One of main protocols used in Internet communications is TCP/IR Conventional TCP/IP is mainly implemented by software processing and operated by a CPU of, for example, a personal computer or an embedded device.

However, as wider bandwidths have been available for network infrastructures and video content and so on transmitted over networks recently, network processing load has been increasing and the conventional CPU processing has become insufficient in performance.

As such, TOE (TCP/IP Offload Engine) has been proposed, in which a subprocessor or dedicated hardware, instead of a CPU, performs TCP/IP protocol processing. By using TOE, TCP/IP processing faster than the conventional software processing can be expected.

TOE has various implementations. For example, JP-A 2008-146486 (KOKAI) discloses a communication apparatus including: a subprocessor A that performs part of socket API processing; a subprocessor B that performs TCP/UDP reception processing; a subprocessor C that performs TCP/UDP transmission processing; a subprocessor D that performs MAC driver and IP reception processing; and a subprocessor E that performs MAC driver and IP transmission proceeding, wherein these subprocessors perform parallel processing.

However, JP-A 2008-146486 (KOKAI) only describes that a single subprocessor performs the TCP/UDP reception processing and does not describe how to parallelize the TCP/UDP reception processing itself.

The TCP/UDP reception processing is divided into a plurality of steps such as reading connection information, writing frame data, and writing the updated connection information. How to perform these steps in parallel is an important factor in the performance of TOE.

SUMMARY OF THE INVENTION

According to one aspect of the present invention, there is provided a data receiving apparatus that receives a frame over a network, the frame including a header and a data portion, comprising:

a first storage unit that stores the data portions of frames;

a second storage unit that stores connection information, the connection information indicating a write location in the first storage unit for the data portion corresponding to a source of a received frame;

a network interface unit that inputs a first received frame;

a header analyzing unit that analyzes a header of the first received frame and outputs first header information indicating a source of the first received frame;

a checksum judging unit that calculates a checksum of the first received frame, and upon completion of the calculation, judges "pass" or "fail" for the checksum and outputs a judgment result;

a first buffer unit that stores a data portion of the first received frame for which the checksum judging unit has calculated the checksum;

a connection information reading unit that reads the connection information corresponding to the first header information from the second storage unit;

a write location identifying unit that identifies a write location in the first storage unit for the data portion of the first received frame based on the connection information read by the connection information reading unit;

a data writing unit that reads the data portion from the first buffer unit and starts writing the read data portion to the write location in the first storage unit identified by the write location identifying unit before the checksum of the first received frame is judged; and a connection information writing unit that generates an updated connection information based on the first header information and, if the judgment result is "pass," writes the updated connection information to the second storage unit while the data writing unit is writing to the first storage unit.

According to one aspect of the present invention, there is provided a data receiving method for receiving frames over a network, comprising:

inputting a received frame;

analyzing a header of the received frame and generating header information indicating a source of the received frame;

calculating a checksum of the received frame and judging "pass" or "fail;"

storing, in a first buffer unit, a data portion of the received frame for which the checksum has been calculated;

reading connection information corresponding to the header information from a second storage unit that stores the connection information, the connection information indicating a write location in a first storage unit for the data portion corresponding to a source of the received frame;

identifying a write location in the first storage unit for the data portion of the received frame based on the read connection information;

reading the data stored in the first buffer unit and starting writing the read data to the identified write location in the first storage unit before the checksum of the received frame is judged; and updating the connection information based on the header information and, if the judgment result is "pass," writing the updated connection information to the second storage unit during the writing to the first storage unit.

According to one aspect of the present invention, there is provided a computer-readable recording media having recorded therein a data receiving program for receiving frames over a network which causes computer to execute:

a step of inputting a received frame;

a step of analyzing a header of the received frame and generating header information indicating a source of the received frame;

a step of calculating a checksum of the received frame and judging "pass" or "fail;"

a step of storing, in a first buffer unit, a data portion of the received frame for which the checksum has been calculated;

a step of reading connection information corresponding to the header information from a second storage unit that stores the connection information, the connection information indicating a write location in a first storage unit for the data portion corresponding to a source of the received frame;

a step of identifying a write location in the first storage unit for the data portion of the received frame based on the read connection information;

a step of reading the data stored in the first buffer unit and starting writing the read data to the identified write location in the first storage unit before the checksum of the received frame is judged; and a step of updating the connection information based on the header information and, if the judgment result is "pass," writing the updated connection information to the second storage unit during the writing to the first storage unit.

DESCRIPTION OF THE EMBODIMENTS

Embodiments of the present invention will be described below with reference to the drawings.

First Embodiment

Figure 1:
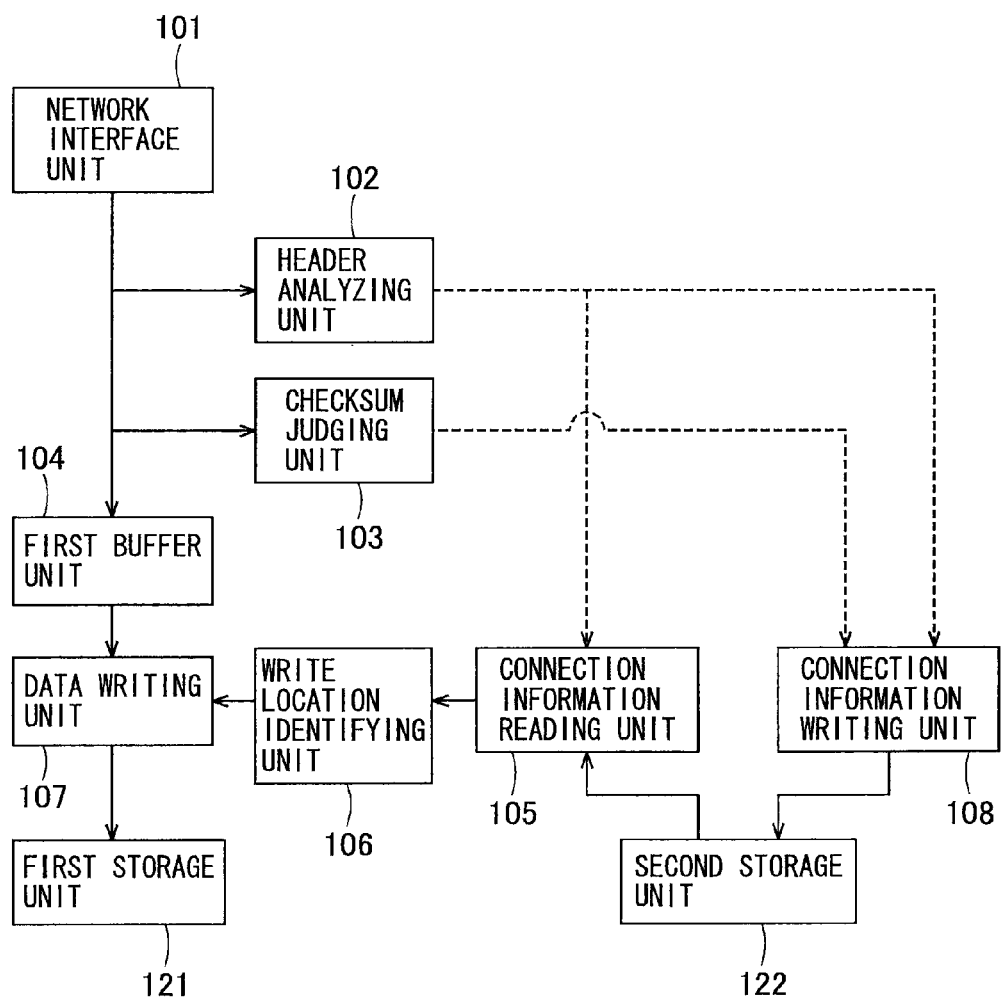
FIG. 1 is a schematic configuration diagram of a data receiving apparatus according to a first embodiment of the present invention.

FIG. 1 shows a schematic configuration of a data receiving apparatus according to a first embodiment of the present invention. The data receiving apparatus includes a network interface unit 101, a header analyzing unit 102, a checksum judging unit 103, a first buffer unit 104, a connection information reading unit 105, a write location identifying unit 106, a data writing unit 107, a connection information writing unit 108, a first storage unit 121, and a second storage unit 122. This data receiving apparatus receives data frames such as of TCP/IP and UDP/IP from data transmitting apparatuses (not shown) over networks such as Ethernet and wireless LAN networks.

The network interface unit 101 may be an NIC (Network Interface Card) or an MAC (Media Access Control), for example, and inputs a received frame from a network. The header analyzing unit 102 analyzes headers (an IP header and a UDP or TCP header) of the received frame and outputs header information.

The checksum judging unit 103 calculates a checksum of the received frame including a data portion thereof. Once the calculation is all completed, it is checked whether or not the calculated checksum matches a checksum sent from a sender. If they match, the checksum judging unit 103 judges "pass." If they do not match, the checksum judging unit 103 judges "fail" because it means that an error has occurred in the data on the network. The checksum judging unit 103 outputs the judgment result to the connection information writing unit 108.

The first buffer unit 104 temporarily stores at least the data portion of the received frame.

The connection information reading unit 105 searches the second storage unit 122 based on the header information output from the header analyzing unit 102 and reads corresponding connection information from the second storage unit 122. The connection information will be described later.

The write location identifying unit 106 identifies, based on the header information output from the header analyzing unit 102 and the connection information read by the connection information reading unit 105, a location to which the data of the received frame is to be written in the first storage unit 121.

The data writing unit 107 reads the data stored in the first buffer unit 104 and writes the data to the location in the first storage unit 121 identified by the write location identifying unit 106.

The connection information writing unit 108 updates the connection information based on the header information and writes the updated connection information to the second storage unit 122 if the judgment result of the checksum judging unit 103 is "pass."

The header analyzing unit 102, the checksum judging unit 103, the connection information reading unit 105, the write location identifying unit 106, the data writing unit 107, and the connection information writing unit 108 are implemented in a processor or a dedicated circuit. The first buffer unit 104, the first storage unit 121, and the second storage unit 122 are memory devices. For example, the first buffer unit 104 may be implemented in on-chip memory, the first storage unit 121 may be implemented in SDRAM, and the second storage unit 122 may be implemented in SDRAM or on-chip memory. The second storage unit 122 may be accessed in parallel with the first storage unit 121. The first buffer unit 104 has multiple areas in which the data portion of the received frame can be stored.

Processing of a received frame (a TCP segment for TCP, or a UDP packet for UDP) will be described.

Both TCP and UDP are connection-oriented protocols, in which a connection determined by a source IP address, a source port number, a destination IP address, and a destination port number is defined between a destination and a source. The data receiving apparatus holds connection information in the second storage unit 122 for each connection. The connection information may be, for example, information about an address area in the first storage unit 121 to which received data is to be written.

The IP header of a received frame includes the source IP address and the destination IP address, and the UDP or TCP header includes the source port number and the destination port number. Therefore, the header analyzing unit 102 analyzes the IP header and the UDP or TCP header of a received frame to obtain and output the header information.

The connection information reading unit 105 identifies a connection based on the header information output from the header analyzing unit 102 and searches for the connection information corresponding to this connection held in the second storage unit 122. If the connection information is found, the connection information reading unit 105 can obtain information stored in association with this connection about an address area in the memory (the first storage unit 121) to which data is to be written.

For example, for UDP, the write location identifying unit 106 identifies the first address in this address area as a write address for the data.

For TCP, a sequence number corresponding to each byte of data is protocol-defined, and the TCP header of a received frame includes the first sequence number of received data (a receiving sequence number). The connection information also includes, in addition to the information about the address area to which data is to be written, a sequence number of data to be written to the beginning of this address area (a base sequence number), for example.

Therefore, for TCP, the write location identifying unit 106 uses the information about the receiving sequence number analyzed by the preceding header analyzing unit 102 in addition to the information about the address area and the information about the base sequence number to identify the write address for the received data as "the first address in the address area+(the receiving sequence number−the base sequence number)."

In this manner, even when data cannot be received in order of sequence number, for example when part of data was lost and only this part is retransmitted later, the data can be rearranged and placed in the first storage unit in a correct order.

The above processing of identifying the write address is exemplary and not limiting. The data writing unit 107 writes the received data to the address in the first storage unit 121 identified by the write location identifying unit 106.

The connection information writing unit 108 writes information that data has been received in the second storage unit 122, for example in association with the connection information. For TCP, information about up to which sequence number data has been received may be written. However, since the data can have been corrupted on the network, a checksum of not only the headers but also the data portion is used in TCP and UDP in order to eliminate corrupted frames.

Therefore, the checksum judging unit 103 calculates the checksum of the received frame including the data portion thereof to judge "pass" or "fail." The connection information writing unit 108 performs writing only if the result is "pass" and does not perform writing if the result is "fail."

In this manner, since the fact that the data has been received is not stored if the result of the checksum is "fail," the data written in the first storage unit 121 is overwritten by subsequent data. This allows the data to be substantially discarded.

Figure 2:
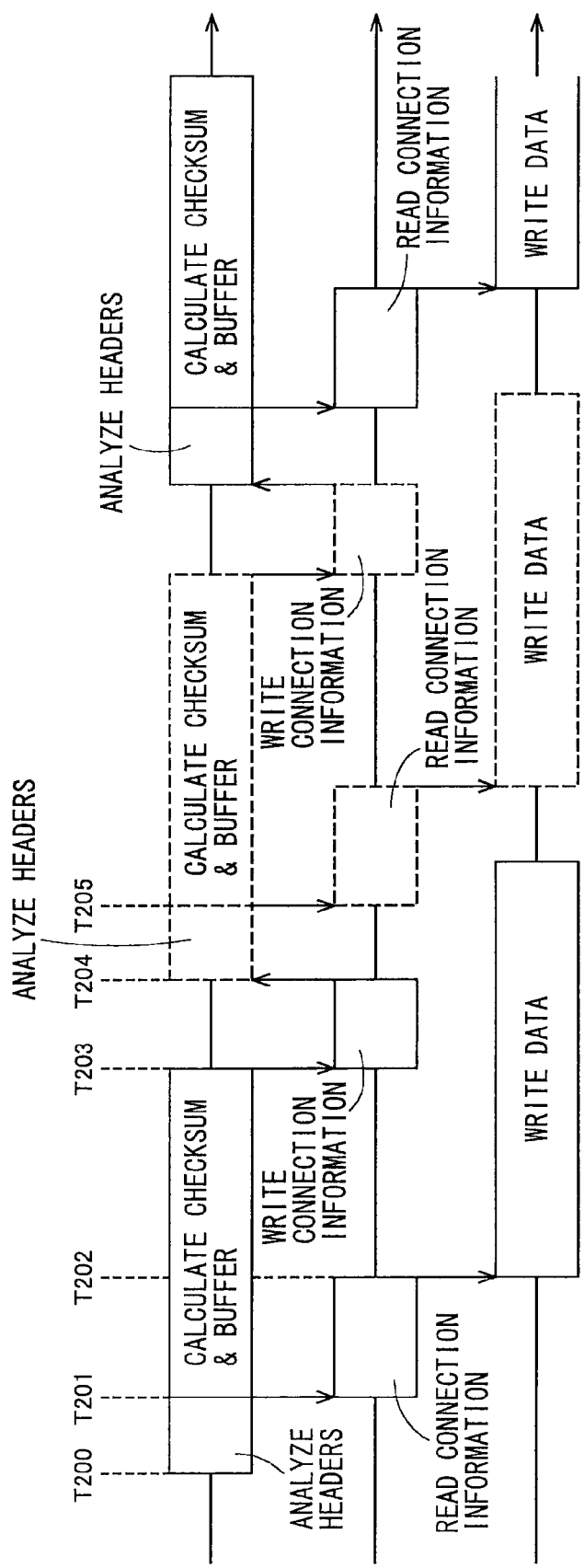
FIG. 2 is a time chart of data reception processing according to the first embodiment.

Now, exemplary data reception processing by the data receiving apparatus according to this embodiment will be described with reference to a time chart shown in FIG. 2. FIG. 2 is a simplified illustration of how processing by each component is parallelized. The first layer shows header analysis processing by the header analyzing unit 102 for a received frame input from the network interface unit 101, checksum calculation processing by the checksum judging unit 103, and buffering processing by the first buffer unit 104.

The second layer of FIG. 2 shows read processing from the second storage unit 122 by the connection information reading unit 105 and write processing by the connection information writing unit 108. The third layer of FIG. 2 shows write processing to the first storage unit 121 by the data writing unit 107.

Processing by the write location identifying unit 106 is omitted because it requires little time. Solid lines and dashed lines are alternately used for easy distinction of processing of adjacent frames, such that processing of a first received frame is depicted with solid lines, processing of a next received frame is depicted with dashed lines, processing of a further next received frame is depicted with solid lines, and so on. This also applies to other time charts hereinafter.

When the network interface unit 101 inputs a first frame, the header analyzing unit 102 scans the input received frame from the beginning in units of a certain number of bytes, for example four bytes, and starts analyzing the headers of the received frame (time T200).

At this point, in parallel with the header analysis, the checksum judging unit 103 may start checksum calculation for the header portion of the received frame, for example in units of four bytes.

When the header analysis is completed, the checksum judging unit 103 scans the data portion following the header portion of the received frame to calculate a checksum of the data portion (time T201). The first buffer unit 104 stores data subjected to the checksum calculation by the checksum judging unit 103. For example, the data subjected to the checksum calculation is stored in a first area of the first buffer unit 104.

Further, the connection information reading unit 105 starts searching for and reading the corresponding connection information based on the header information (such as the source port number, source IP address, destination port number, and destination IP address) analyzed by the header analyzing unit 102.

When the connection information reading unit 105 completes the reading of the connection information (time T202), the write location identifying unit 106 identifies a write location (address) for the data of the received frame based on the read connection information and the header information (such as the sequence number).

Before the checksum judging unit 103 judges the checksum, the data writing unit 107 reads the data portion of the received frame from the first buffer unit 104, for example in units of four bytes, and starts writing the data to the location in the first storage unit 121 identified by the write location identifying unit 106.

Here, the checksum judging unit 103 and the data writing unit 107 process the same data portion of the received frame at the same rate (for example, in units of four bytes). The checksum judging unit 103 has started the checksum calculation just when the connection information reading unit 105 started reading. On the other hand, the data writing unit 107 starts writing the data after the connection information reading unit 105 has read the connection information and the write location identifying unit 106 has identified the write location.

Therefore, the checksum calculation by the checksum judging unit 103 and the buffering by the first buffer unit 104 are completed earlier than the writing by the data writing unit 107. Also, the first storage unit 121 to which the data writing unit 107 writes usually has other read accesses for written data by a host CPU (not shown) and so on. The writing may be suspended due to their access arbitration, resulting in that the checksum judging unit 103 finishes the processing earlier.

As such, if the checksum judgment result of the checksum judging unit 103 is "pass," the connection information writing unit 108 writes the (updated) connection information to the second storage unit 122 without waiting until the data writing unit 107 completes the writing (time T203). The connection information written to the second storage unit 122 may include information about an address area in the first storage unit 121 to which data of a next received frame is to be written, for example.

When the writing of the connection information is completed and a next frame is received, the header analyzing unit 102 starts analyzing the headers of the next received frame in advance while the data writing unit 107 is writing (time T204). The checksum judging unit 103 also calculates the checksum of the next received frame in advance. For example, the data of the next received frame subjected to the checksum calculation is stored in a second area of the first buffer unit 104. Therefore, the data of the next received frame subjected to the checksum calculation is stored in the second area while the data writing unit 107 is reading data from the first area.

When the header analyzing unit 102 completes the header analysis and outputs the header information, the connection information reading unit 105 starts searching for and reading the connection information about the next received frame based on this header information in advance while the data writing unit 107 is writing (time T205). The same processing is repeated hereafter.

Thus, in the data receiving apparatus according to this embodiment, the header analyzing unit 102, the checksum judging unit 103, and the connection information reading unit 105 perform the header analysis, checksum calculation, and reading of the connection information for a next received frame in parallel while the data writing unit 107 is writing data of a received frame. This allows the data reception processing to be efficiently parallelized to increase the processing speed.

Second Embodiment

Figure 3:
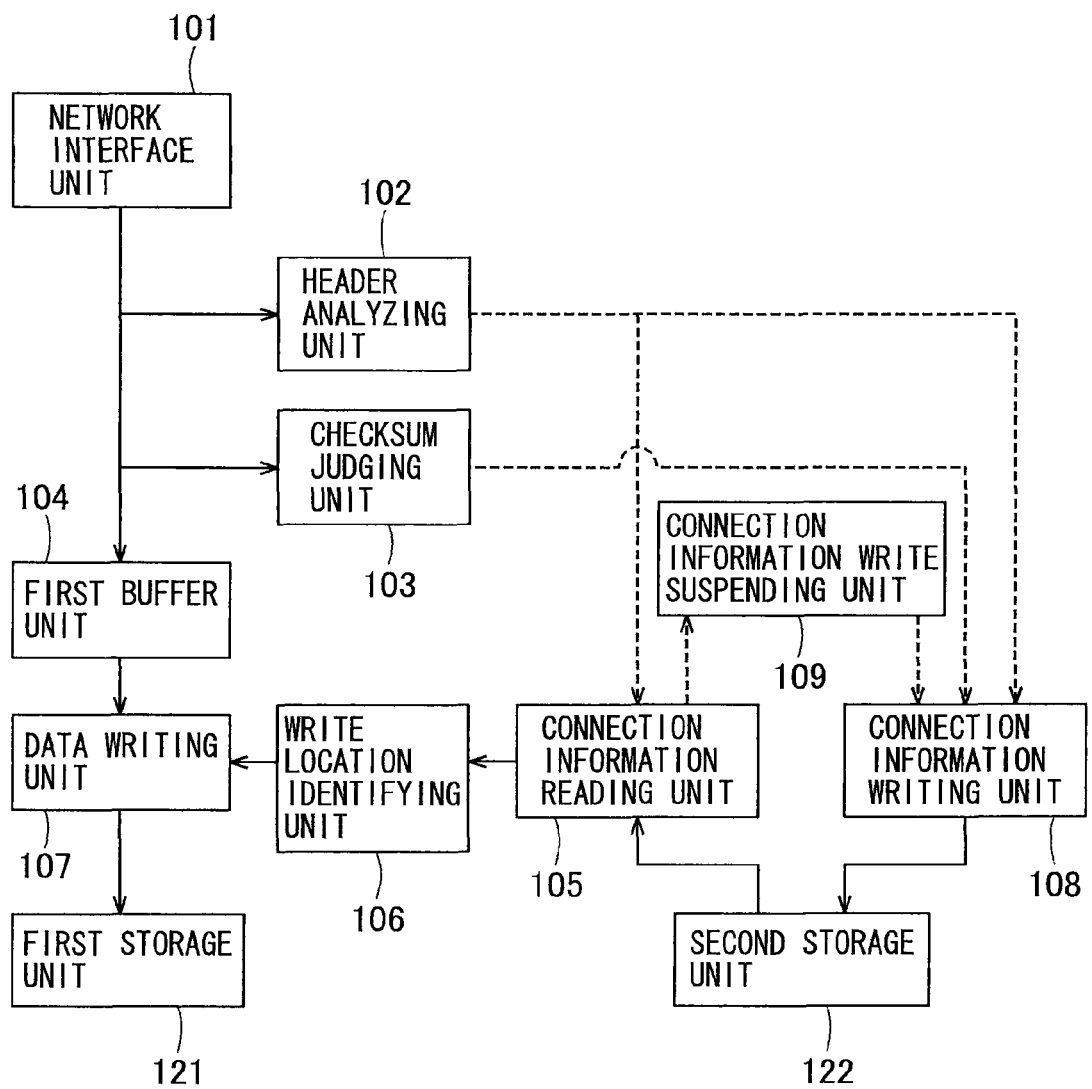
FIG. 3 is a schematic configuration diagram of a data receiving apparatus according to a second embodiment of the present invention.

FIG. 3 shows a schematic configuration of the data receiving apparatus according to a second embodiment of the present invention. The data receiving apparatus according to this embodiment has a configuration such that a connection information write suspending unit 109 is added to the data receiving apparatus according to the above-described first embodiment shown in FIG. 1.

The connection information write suspending unit 109 suspends writing by the connection information writing unit 108 until the connection information reading unit 105 completes the reading of the connection information from the second storage unit 122. When the connection information reading unit 105 completes the reading, the connection information write suspending unit 109 instructs execution of the suspended write processing by the connection information writing unit 108.

Figure 4:
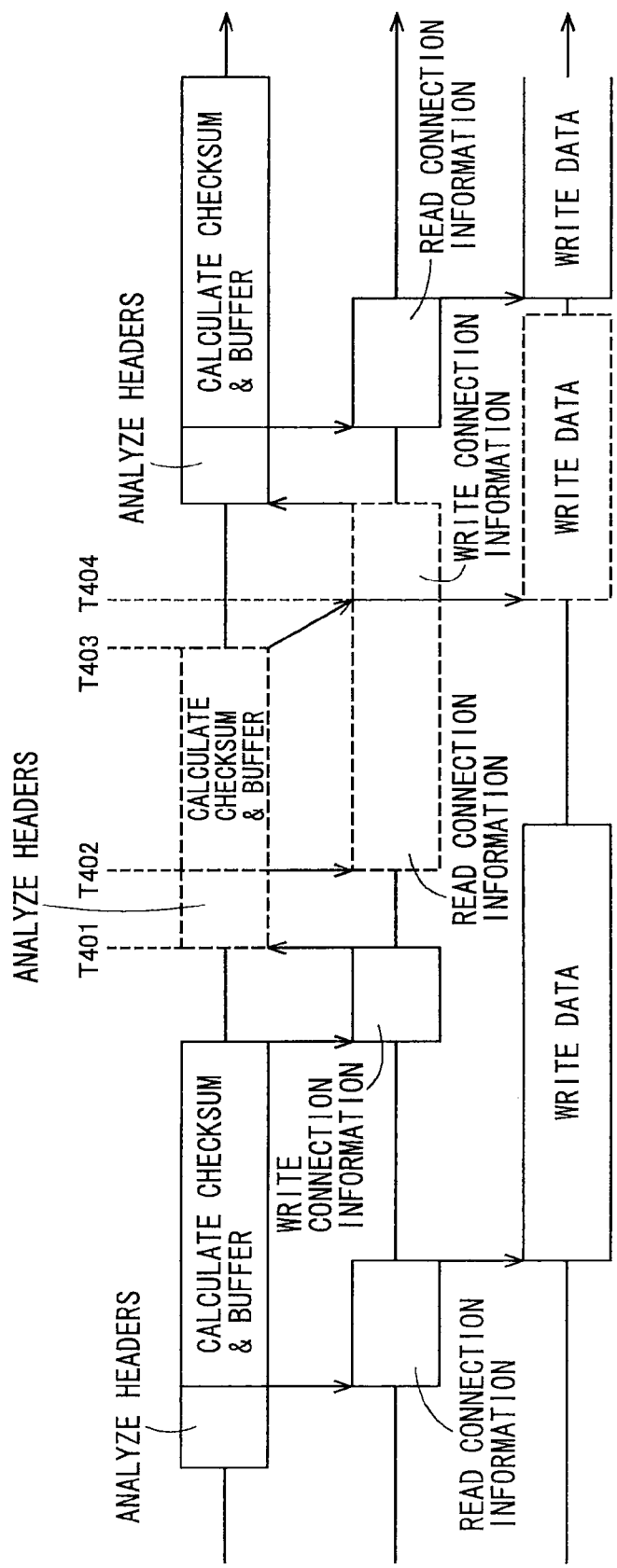
FIG. 4 is a time chart of data reception processing according to the second embodiment.

Exemplary data reception processing by the data receiving apparatus according to this embodiment will be described with reference to a time chart shown in FIG. 4.

(Time T401) The connection information writing unit 108 completes the writing of the connection information. At this point, the data writing unit 107 is writing data to the first storage unit 121. The network interface unit 101 receives a next frame, and the header analyzing unit 102 starts analyzing the headers of the next received frame in advance while the data writing unit 107 is writing. The checksum judging unit 103 also calculates a checksum of the header portion in advance. It is assumed that the length of data of the frame received at time T401 is short.

(Time T402) When the header analyzing unit 102 completes the header analysis, the checksum judging unit 103 scans the data portion following the header portion of the received frame to calculate a checksum of the data portion. The first buffer unit 104 stores data subjected to the checksum calculation by the checksum judging unit 103.

The connection information reading unit 105 starts searching for and reading the connection information about the next received frame based on the header information in advance while the data writing unit 107 is writing.

(Time T403) Since the length of the frame received at time T401 is short, the checksum calculation and judgment is completed before the connection information reading unit 105 completes the reading of the connection information. The connection information write suspending unit 109 suspends writing by the connection information writing unit 108 until the connection information reading unit 105 completes the connection information reading processing.

(Time T404) Upon completion of the reading by the connection information reading unit 105, the connection information write suspending unit 109 instructs execution of the suspended write processing by the connection information writing unit 108. In response to the instruction, the connection information writing unit 108 starts writing the (updated) connection information. The write location identifying unit 106 identifies a write location based on the connection information read by the connection information reading unit 105. The data writing unit 107 retrieves data from the first buffer unit 104 and writes the data to the identified write location.

In the data receiving apparatus according to the above-described first embodiment, the connection information writing unit 108 writes the connection information when the checksum calculation and judgment by the checksum judging unit 103 is completed.

However, in the case such as where the length of data of the received frame is short, the checksum calculation and judgment is completed before completion of the reading by the connection information reading unit 105. If the connection information writing unit 108 writes the connection information while the connection information reading unit 105 is reading, some data may be subjected to the former writing before the latter reading. This may lead to collapse of operation due to the inversion in the operation order.

In the second embodiment, even when the checksum calculation and judgment is completed, the connection information write suspending unit 109 suspends the writing of the connection information until the reading of the connection information is completed, and causes the writing to be performed after completion of the reading. Therefore, the inversion in the operation order can be prevented.

Thus, the data receiving apparatus according to this embodiment can efficiently parallelize the data reception processing to increase the processing speed. The data receiving apparatus according to this embodiment can also properly control read operations and write operations for the connection information.

Third Embodiment

Figure 5:
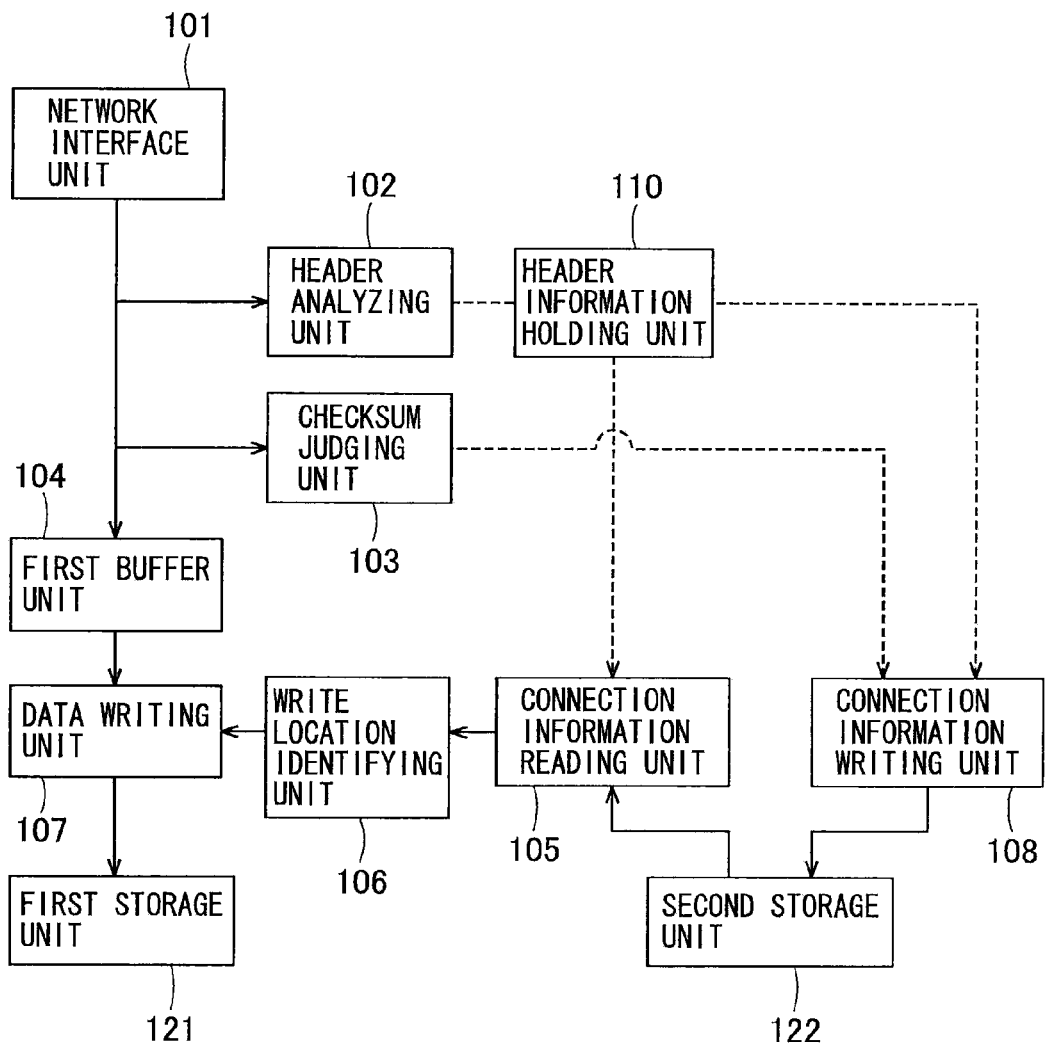
FIG. 5 is a schematic configuration diagram of a data receiving apparatus according to a third embodiment of the present invention.

FIG. 5 shows a schematic configuration of the data receiving apparatus according to a third embodiment of the present invention. The data receiving apparatus according to this embodiment has a configuration such that a header information holding unit 110 is added to the data receiving apparatus according to the above-described first embodiment shown in FIG. 1.

The header information holding unit 110 holds part of the header information about of a current received frame (e.g., for TCP, information about up to which sequence number the data has been received), and at the same time, holds the header information obtained by analyzing the headers of a next received frame. This allows the headers of the next received frame to be analyzed before the connection information writing unit 108 completes the writing, i.e., while the connection information writing unit 108 is writing the connection information.

Figure 6:
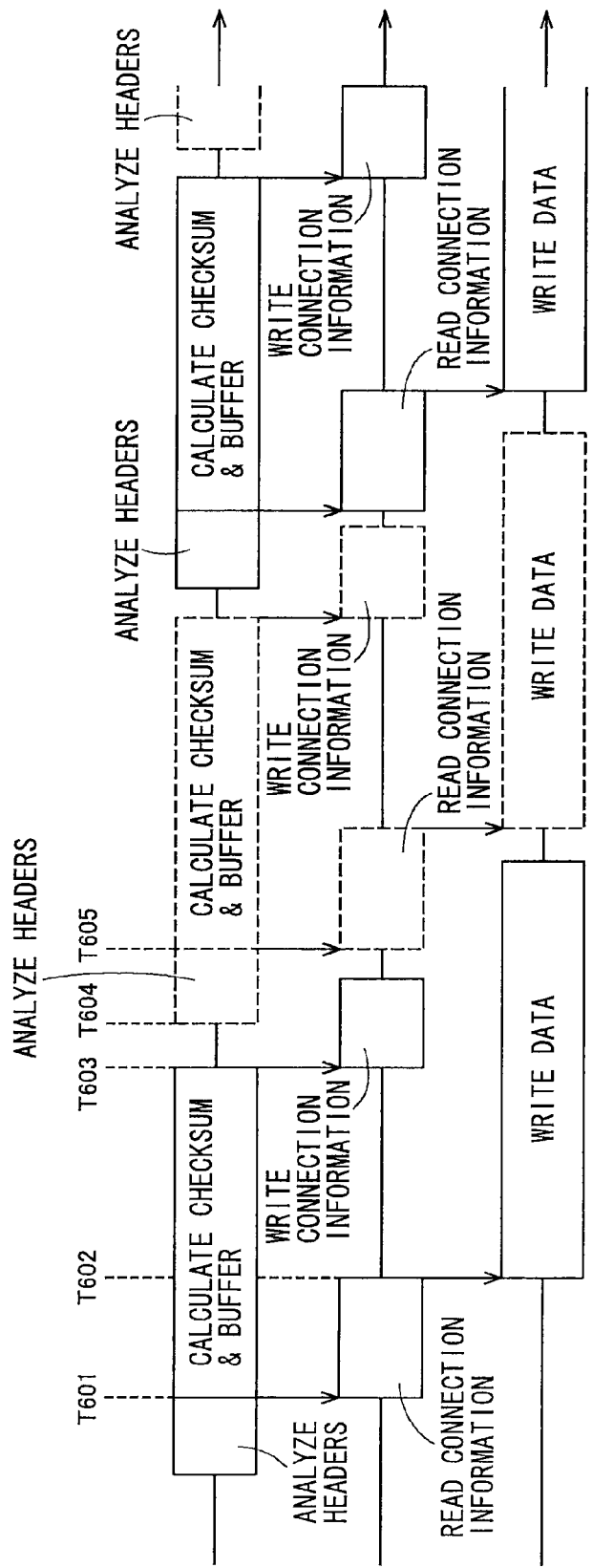
FIG. 6 is a time chart of data reception processing according to the third embodiment.

Exemplary data reception processing by the data receiving apparatus according to this embodiment will be described with reference to a time chart shown in FIG. 6.

(Time T601) When the header analysis is completed, the checksum judging unit 103 scans the data portion following the header portion of a received frame to calculate the checksum of the data portion. The first buffer unit 104 stores data subjected to the checksum calculation by the checksum judging unit 103.

The connection information reading unit 105 starts searching for and reading the corresponding connection information based on the header information (such as the source port number, source IP address, destination port number, and destination IP address) obtained by the header analysis of the header analyzing unit 102.

(Time T602) When the connection information reading unit 105 completes the reading of the connection information, the write location identifying unit 106 identifies a write location (address) for the data of the received frame based on the read connection information and the header information (such as the sequence number).

The data writing unit 107 reads the data portion of the received frame from the first buffer unit 104, for example in units of four bytes, and starts writing to the location in the first storage unit 121 identified by the write location identifying unit 106.

(Time T603) If the checksum judgment result of the checksum judging unit 103 is "pass," the connection information writing unit 108 writes the (updated) connection information to the second storage unit 122 without waiting until the data writing unit 107 completes the writing.

(Time T604) The network interface unit 101 receives a next frame while the connection information is being written. The header analyzing unit 102 starts analyzing the headers of the next received frame in advance while the data writing unit 107 is writing. The header information is stored in the header information holding unit 110.

(Time T605) When the connection information writing unit 108 completes the writing and the header analyzing unit 102 completes the header analysis, the connection information reading unit 105 starts searching for and reading the connection information about the next received frame based on the header information in advance while the data writing unit 107 is writing. The checksum judging unit 103 calculates the checksum.

Thus, in the data receiving apparatus according to this embodiment, the header analyzing unit 102, the checksum judging unit 103, and the connection information reading unit 105 perform the header analysis, checksum calculation, and reading of the connection information for a next received frame in parallel while the data writing unit 107 is writing the data portion of a received frame. This allows the data reception processing to be efficiently parallelized to increase the processing speed.

In addition, while the connection information is being written, the headers of the next received frame can be analyzed and the header information can be held. Therefore, the header of the next received frame can be analyzed while the connection information writing unit 108 is writing, and this allows the data reception processing to be further efficiently parallelized to increase the processing speed.

Fourth Embodiment

Figure 7:
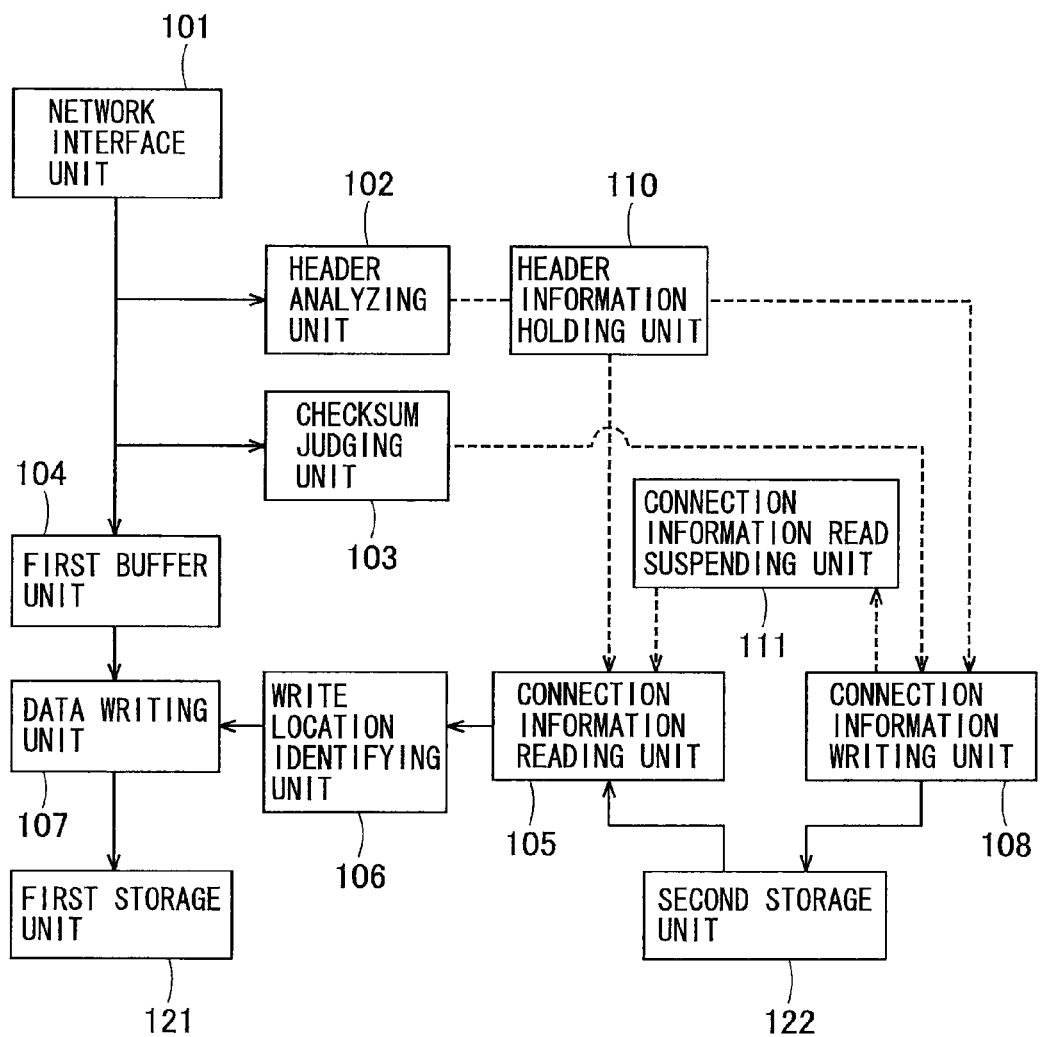
FIG. 7 is a schematic configuration diagram of a data receiving apparatus according to a fourth embodiment of the present invention.

FIG. 7 shows a schematic configuration of the data receiving apparatus according to a fourth embodiment of the present invention. The data receiving apparatus according to this embodiment has a configuration such that a connection information read suspending unit 111 is added to the data receiving apparatus according to the above-described third embodiment shown in FIG. 5.

The connection information read suspending unit 111 suspends reading by the connection information reading unit 105 until the connection information writing unit 108 completes writing. When the connection information writing unit 108 completes the writing, the connection information read suspending unit 111 instructs execution of the suspended read processing by the connection information reading unit 105.

In this manner, if the header analysis processing of a second received frame that follows a first received frame is completed earlier than the write processing of the connection information about the first received frame, reading of the connection information about the second received frame can be suspended until the writing of the connection information about the first received frame is completed. Then, the connection information about the second received frame can be read after completion of the writing of the connection information about the first received frame.

Figure 8:
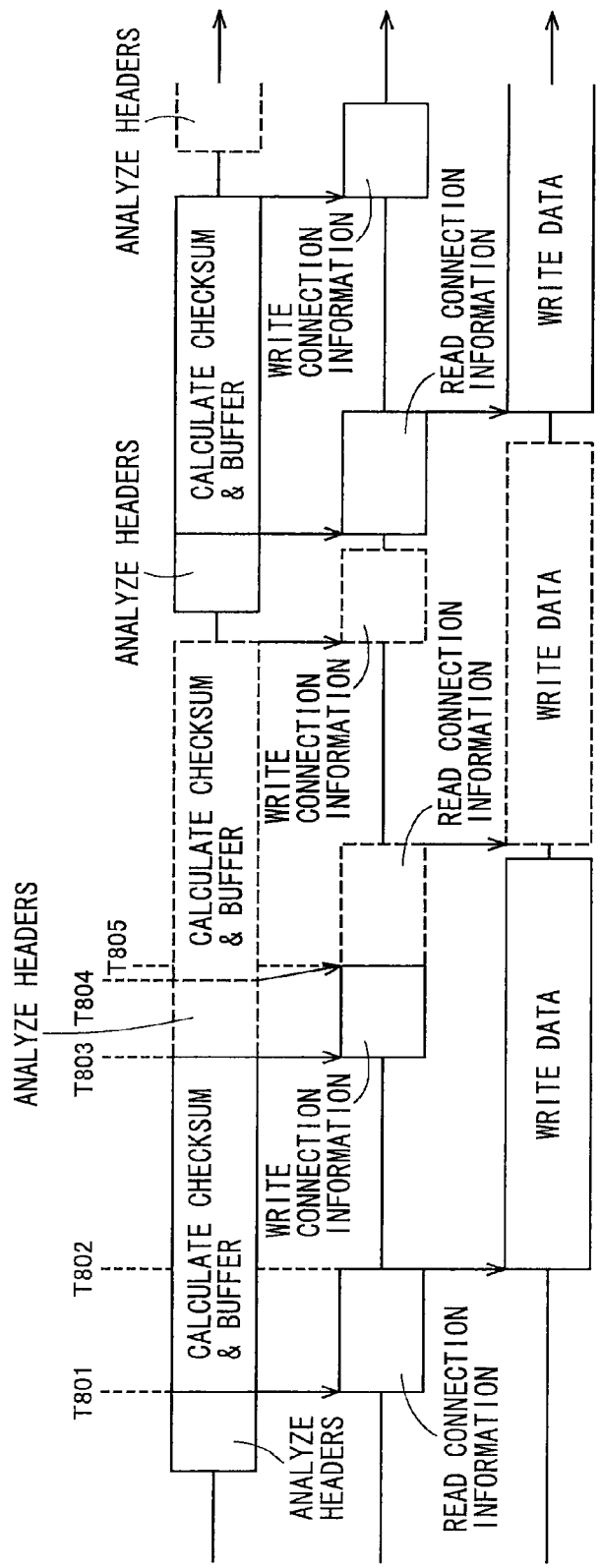
FIG. 8 is a time chart of data reception processing according to the fourth embodiment.

Exemplary data reception processing by the data receiving apparatus according to this embodiment will be described with reference to a time chart shown in FIG. 8.

(Time T801) When the header analysis is completed, the checksum judging unit 103 scans the data portion following the header portion of a received frame to calculate the checksum of the data portion. The first buffer unit 104 stores data subjected to the checksum calculation by the checksum judging unit 103.

The connection information reading unit 105 starts searching for and reading the corresponding connection information based on the header information (such as the source port number, source IP address, destination port number, and destination IP address) analyzed by the header analyzing unit 102.

(Time T802) When the connection information reading unit 105 completes the reading of the connection information, the write location identifying unit 106 identifies a write location (address) for the data of the received frame based on the read connection information and the header information (such as the sequence number).

The data writing unit 107 reads the data portion of the received frame from the first buffer unit 104, for example in units of four bytes, and starts writing to the location in the first storage unit 121 identified by the write location identifying unit 106.

(Time T803) If the checksum judgment result of the checksum judging unit 103 is "pass," the connection information writing unit 108 writes the (updated) connection information to the second storage unit 122 without waiting until the data writing unit 107 completes the writing.

The network interface unit 101 further receives a next frame. The header analyzing unit 102 starts analyzing the headers of the next received frame in advance while the data writing unit 107 is writing.

(Time T804) The header analysis is completed before the writing of the connection information is completed. At this point, the connection information read suspending unit 111 suspends reading by the connection information reading unit 105 until the connection information writing unit 108 completes the writing.

(Time T805) The connection information writing unit 108 completes the writing. The connection information read suspending unit 111 instructs execution of the suspended read processing by the connection information reading unit 105. The connection information reading unit 105 starts searching for and reading the connection information about the next received frame based on the header information in advance while the data writing unit 107 is writing.

In the data receiving apparatus according to the above-described third embodiment, the connection information reading unit 105 reads the connection information when the header analyzing unit 102 completes the header analysis.

However, if the analysis operation by the header analyzing unit 102 is completed earlier than the write operation by the connection information writing unit 108, the connection information reading unit 105 will search for the connection information about the next received frame while the connection information writing unit 108 is writing. As a result, some data may be subjected to the former reading before the latter writing. This may lead to collapse of operation due to the inversion in the operation order.

In the fourth embodiment, even when the header analyzing unit 102 completes the header analysis, the reading of the connection information is suspended until the writing of the connection information is completed, so that the reading is performed after completion of the writing. Therefore, the inversion in the operation order can be prevented.

Thus, the data receiving apparatus according to this embodiment can efficiently parallelize the data reception processing to increase the processing speed. The data receiving apparatus according to this embodiment can also properly control read operations and write operations for the connection information.

Fifth Embodiment

Figure 9:
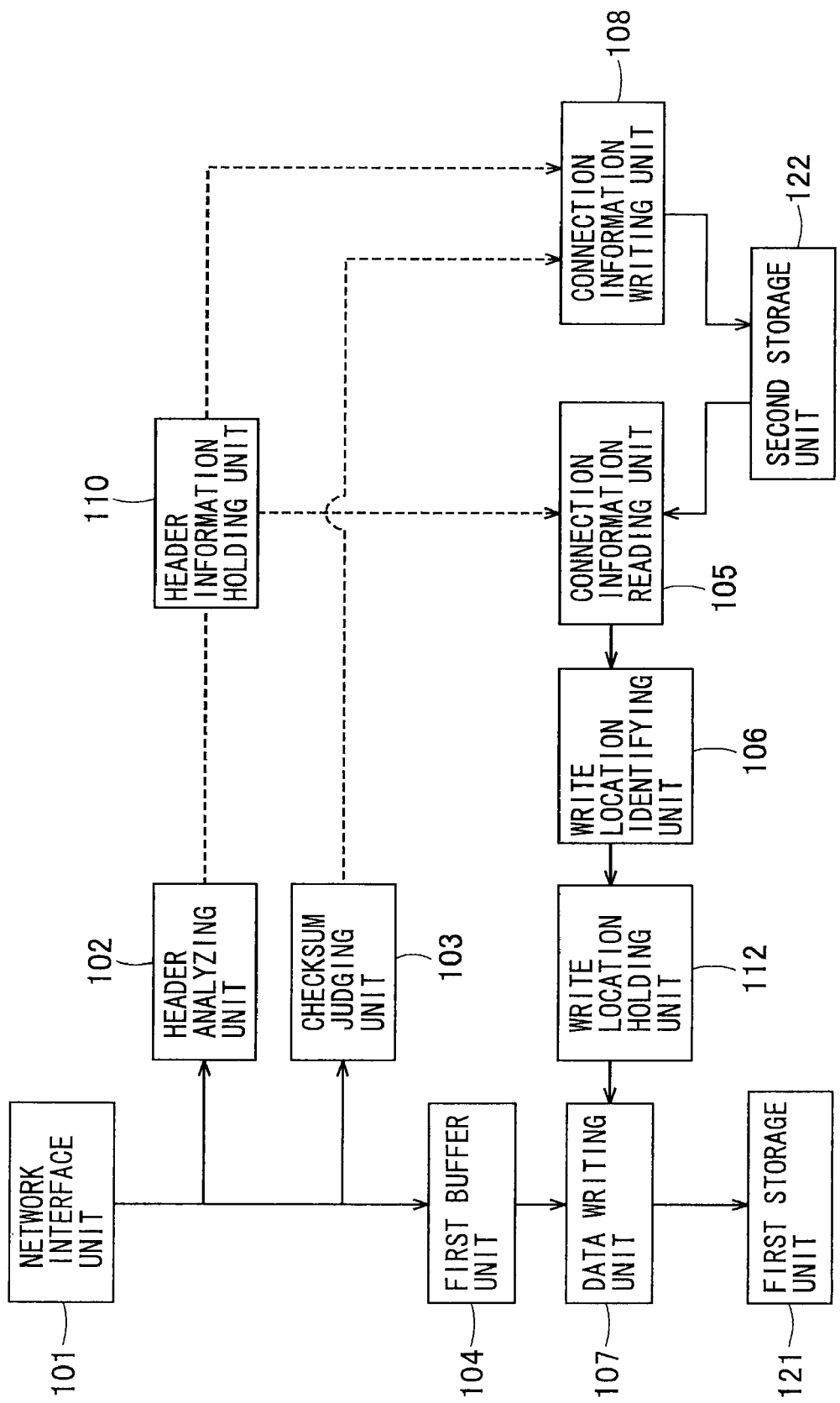
FIG. 9 is a schematic configuration diagram of a data receiving apparatus according to a fifth embodiment of the present invention.

FIG. 9 shows a schematic configuration of the data receiving apparatus according to a fifth embodiment of the present invention. The data receiving apparatus according to this embodiment has a configuration such that a write location holding unit 112 is added to the data receiving apparatus according to the above-described third embodiment shown in FIG. 5.

In this embodiment, the first buffer unit 104 passes data of a first received frame to the data writing unit 107 while it buffers data of a second received frame that follows the first received frame and that has been subjected to the checksum calculation.

The write location identifying unit 106 identifies a write location for the second received frame while the data writing unit 107 is writing the data of the first received frame.

The write location holding unit 112 holds the write location for the second received frame identified by the write location identifying unit 106 until the data writing unit 107 finishes writing the first received frame.

When the writing of the received frame (first received frame) is completed, the data writing unit 107 checks whether the write location for the following received frame (second received frame) is held in the write location holding unit 112. If the write location is held in the write location holding unit 112, the data writing unit 107 retrieves the buffered data of the next received frame (second received frame) from the first buffer unit 104 and writes the data to the write location in the first storage unit held in the write location holding unit 112.

Figure 10:
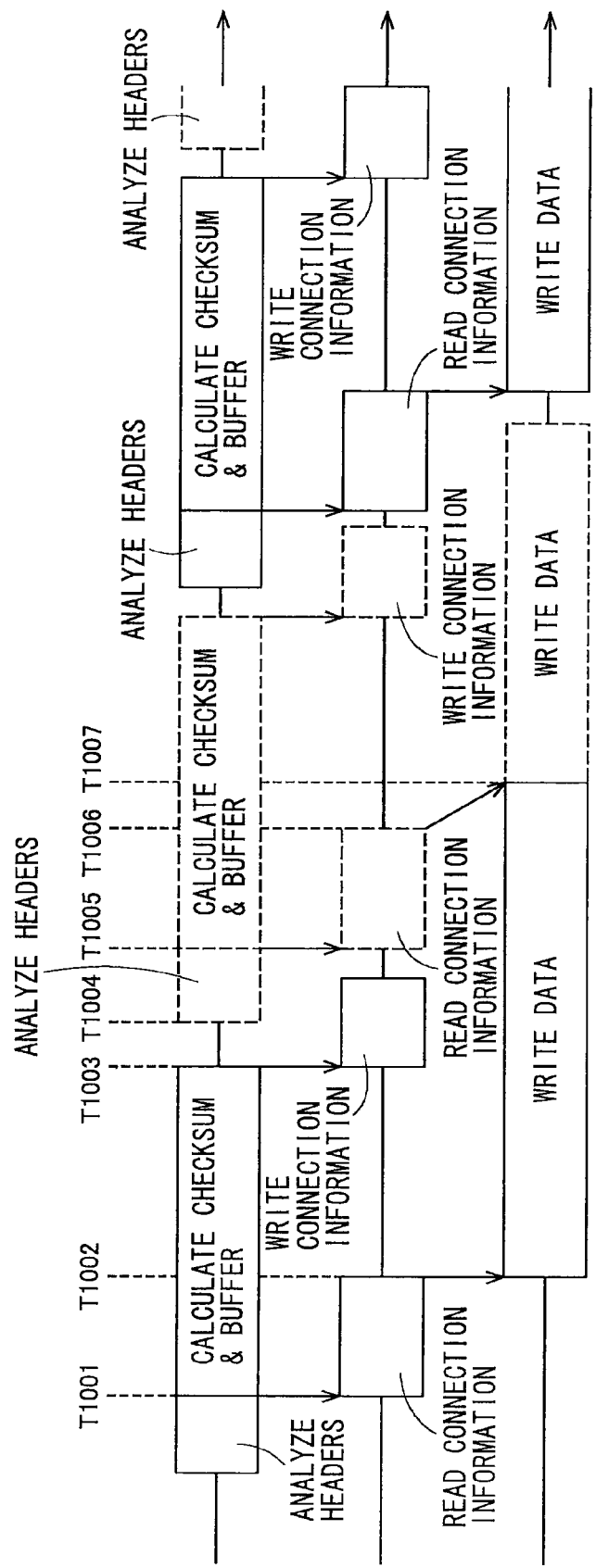
FIG. 10 is a time chart of data reception processing according to the fifth embodiment.

Exemplary data reception processing by the data receiving apparatus according to this embodiment will be described with reference to a time chart shown in FIG. 10.

(Time T1001) When the header analysis is completed, the checksum judging unit 103 scans the data portion following the header portion of a received frame to calculate the checksum of the data portion. The first buffer unit 104 stores data subjected to the checksum calculation by the checksum judging unit 103.

The connection information reading unit 105 starts searching for and reading the corresponding connection information based on the header information (such as the source port number, source IP address, destination port number, and destination IP address) analyzed by the header analyzing unit 102.

(Time T1002) When the connection information reading unit 105 completes the reading of the connection information, the write location identifying unit 106 identifies a write location (address) for the data of the received frame based on the read connection information and the header information (such as the sequence number). The write location identifying unit 106 stores the identified write location in the write location holding unit 112.

The data writing unit 107 reads the data portion of the received frame from the first buffer unit 104, for example in units of four bytes, and starts writing to the write location in the first storage unit 121 stored in the write location holding unit 112.

(Time T1003) If the checksum judgment result of the checksum judging unit 103 is "pass," the connection information writing unit 108 writes the (updated) connection information to the second storage unit 122 without waiting until the data writing unit 107 completes the writing.

(Time T1004) While the connection information is being written, the network interface unit 101 further receives a next frame. The header analyzing unit 102 starts analyzing the headers of the next received frame in advance while the data writing unit 107 is writing. The analyzed header information is stored in the header information holding unit 110.

(Time T1005) When the connection information writing unit 108 completes the writing and the header analyzing unit 102 completes the header analysis, the connection information reading unit 105 starts searching for and reading the connection information about the next received frame based on the header information in advance while the data writing unit 107 is writing.

The checksum judging unit 103 scans the data portion following the header portion of the received frame to calculate the checksum of the data portion. The first buffer unit 104 stores data subjected to the checksum calculation by the checksum judging unit 103.

(Time T1006) The connection information reading unit 105 completes the reading of the connection information while the data writing unit 107 is writing the data. The write location identifying unit 106 identifies a write location (address) for the data of the next received frame that follows the received frame being written by the data writing unit 107. The write location identifying unit 106 stores the identified write location in the write location holding unit 112.

(Time T1007) The data writing unit 107 completes the writing of the received frame and checks whether the write location for the following received frame is held in the write location holding unit 112. Since the write location is held in the write location holding unit 112, the data writing unit 107 retrieves the buffered data of the next received frame from the first buffer unit 104 and starts writing to the write location in the first storage unit 121 held in the write location holding unit 112.

Thus, in this embodiment, a write location for an n+1th (n is a natural number) received frame is held and write processing for this frame is suspended until data write processing for an nth received frame is completed. When the data write processing for the nth received frame is completed, the write processing for the n+1th received frame is started.

This allows more parallelized processing than the data receiving apparatus according to the above-described third embodiment, so that the processing speed can be increased.

Sixth Embodiment

Figure 11:
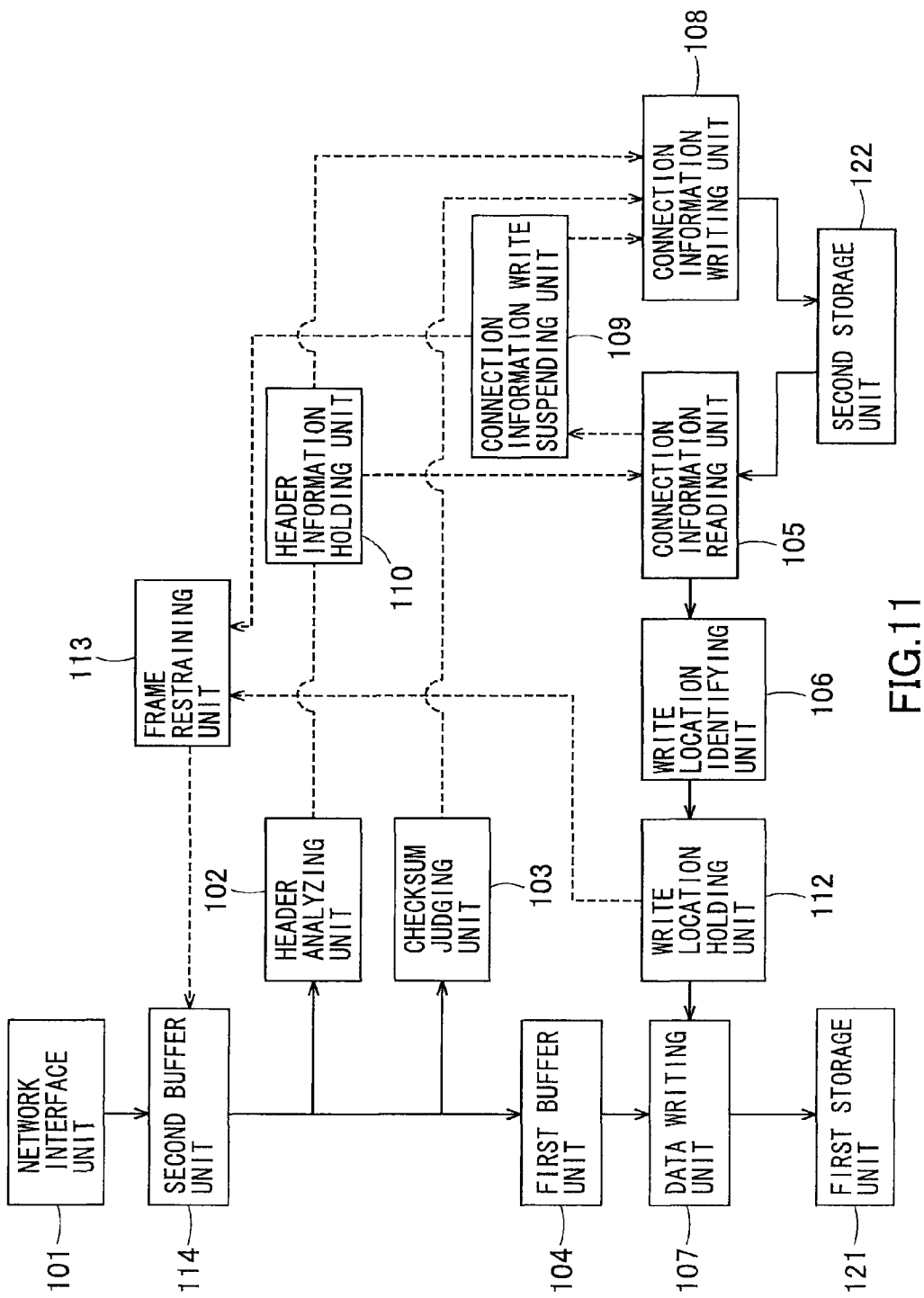
FIG. 11 is a schematic configuration diagram of a data receiving apparatus according to a sixth embodiment of the present invention.

FIG. 11 shows a schematic configuration of the data receiving apparatus according to a sixth embodiment of the present invention. The data receiving apparatus according to this embodiment has a configuration such that the connection information write suspending unit 109, the header information holding unit 110, the write location holding unit 112, a frame restraining unit 113, and a second buffer unit 114 are added to the data receiving apparatus according to the above-described first embodiment shown in FIG. 1. The connection information write suspending unit 109, the header information holding unit 110, and the write location holding unit 112 have the same functions as described in the above second, third, and fifth embodiments and therefore will not be described in detail.

The second buffer unit 114 temporarily buffers a received frame input by the network interface unit 101.

The header analyzing unit 102 analyzes the headers of the received frame output by the second buffer unit 114. The checksum judging unit 103 calculates the checksum of the received frame output by the second buffer unit 114. The first buffer unit 104 buffers data output by the second buffer unit 114 and subjected to the checksum calculation by the checksum judging unit 103.

The frame restraining unit 113 restrains the second buffer unit 114 from outputting a new received frame when a limit number of connection information write operations that can be suspended by the connection information write suspending unit 109 is reached, or when a limit number of write locations that can be held by the write location holding unit 112 is reached.

The limit numbers may be any numbers, but they are set to one in a typical case. In this case, the frame restraining unit 113 restrains the second buffer unit 114 from outputting a new received frame when the connection information write suspending unit 109 is suspending a write operation, or when the write location holding unit 112 is holding a write location.

Figure 12:
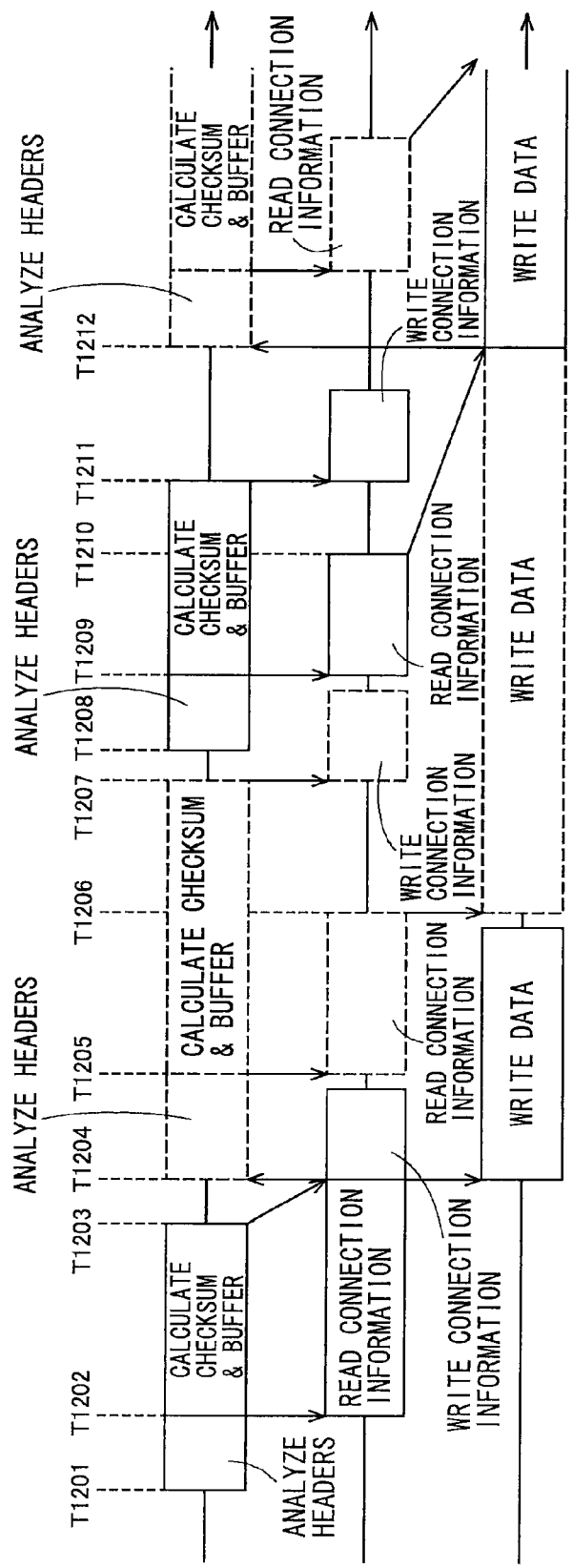
FIG. 12 is a time chart of data reception processing according to the sixth embodiment.

Exemplary data reception processing by the data receiving apparatus according to this embodiment where the limit numbers are set to one will be described with reference to a time chart shown in FIG. 12. For simplicity, it is assumed here that the judgment result of the checksum calculation for every received frame is "pass."

(Time T1201) The header analyzing unit 102 analyzes the headers of a first received frame input by the network interface unit 101 and temporarily buffered and output by the second buffer unit 114.

(Time T1202) When the header analysis is completed, the checksum judging unit 103 scans the data portion following the header portion of the received frame to calculate the checksum of the data portion. The first buffer unit 104 stores data subjected to the checksum calculation by the checksum judging unit 103.

The connection information reading unit 105 starts searching for and reading the corresponding connection information based on the header information analyzed by the header analyzing unit 102.

(Time T1203) The checksum calculation and judgment is completed before the connection information reading unit 105 completes the reading. The connection information write suspending unit 109 temporarily suspends writing by the connection information writing unit 108 until the connection information reading unit 105 completes the connection information reading processing. The frame restraining unit 113 restrains the second buffer unit 114 from outputting a second received frame that follows the first received frame.

(Time T1204) As the connection information reading unit 105 completes the reading, the connection information write suspending unit 109 instructs execution of the suspended write processing by the connection information writing unit 108. The connection information writing unit 108 starts the write processing, and the frame restraining unit 113 permits the second buffer unit 114 to output the second received frame.

The write location identifying unit 106 identifies a data write location based on the read connection information and stores the data write location in the write location holding unit 112. The data writing unit 107 refers to the write location stored in the write location holding unit 112 to retrieve data (data of the first received frame) from the first buffer unit 104 and writes the data to the first storage unit 121.

In parallel with the write processing by the connection information writing unit 108 and the write processing by the data writing unit 107, the header analyzing unit 102 analyzes the headers of the second received frame output from the second buffer unit. The header information is stored in the header information holding unit 110.

(Time T1205) When the header analysis for the second received frame is completed, the checksum judging unit 103 scans the data portion following the header portion of the second received frame to calculate the checksum of the data portion. The first buffer unit 104 stores data subjected to the checksum calculation by the checksum judging unit 103.

The connection information reading unit 105 starts searching for and reading the corresponding connection information based on the header information analyzed by the header analyzing unit 102.

(Time T1206) The connection information reading unit 105 completes the reading of the connection information. The write location identifying unit 106 identifies a data write location based on the read connection information and stores the data write location in the write location holding unit 112.

The data writing unit 107 retrieves data (data of the second received frame) from the first buffer unit 104 and writes the data to the write location in the first storage unit 121 stored in the write location holding unit 112.

(Time T1207) The checksum calculation and judgment for the second received frame is completed. The connection information writing unit 108 starts write processing to the second storage unit 122 while the data writing unit 107 is writing to the first storage unit 121.

(Time T1208) The header analyzing unit 102 analyzes the headers of a third received frame that follows the second received frame and has been input by the network interface unit 101 and temporarily buffered and output by the second buffer unit 114. At this point, the write processing by the connection information writing unit 108 to the second storage unit 122 has not been completed. That is, the header analysis and the writing of the connection information are performed in parallel.

(Time T1209) When the header analysis for the third received frame is completed, the checksum judging unit 103 scans the data portion following the header portion of the third received frame to calculate the checksum of the data portion. The first buffer unit 104 stores data subjected to the checksum calculation by the checksum judging unit 103.

The connection information reading unit 105 starts searching for and reading the corresponding connection information based on the header information analyzed by the header analyzing unit 102.

(Time T1210) The connection information reading unit 105 completes the reading of the connection information. The write location identifying unit 106 identifies a write location for the data of the third received frame based on the read connection information and stores the write location in the write location holding unit 112.

At this point, the data writing unit 107 has not completed the writing of the data of the second received frame. Therefore, the write location holding unit 112 holds the write location. The frame restraining unit 113 restrains the second buffer unit 114 from outputting a fourth received frame that follows the third received frame.

(Time T1211) The checksum calculation and judgment for the third received frame is completed. The connection information writing unit 108 starts write processing to the second storage unit 122 while the data writing unit 107 is writing to the first storage unit 121.

(Time T1212) The data writing unit 107 completes the writing of the data of the second received frame. The data writing unit 107 checks whether the write location for the following received frame, i.e., the third received frame, is held in the write location holding unit 112.

Since the write location for the third received frame is held in the write location holding unit 112, the data writing unit 107 retrieves the data of the third received frame from the first buffer unit 104 and starts writing the data to the write location in the first storage unit 121 held by the write location holding unit 112.

The number of write locations held by write location holding unit 112 becomes zero, so that the frame restraining unit 113 permits the second buffer unit 114 to output the fourth received frame. The header analyzing unit 102 analyzes the headers of the fourth received frame.

The same processing is repeated hereafter.

Thus, if the checksum calculation is completed before completion of the reading of the connection information, writing of the (updated) connection information is suspended until the reading of the connection information is completed, and the second buffer unit 114 buffers a next received frame. When the reading of the connection information is completed and the writing of the connection information is started, the header analysis for the buffered next received frame is started.

Also, until data writing of an nth (n is a natural number) received frame to the first storage unit 121 is completed, the write location holding unit 112 holds a write location for an n+1th received frame to suspend data writing of the n+1th received frame, and the second buffer unit 114 buffers an n+2th received frame. When the data writing of the nth received frame is completed and the data writing of the n+1th received frame is started, the buffered n+2th received frame is output from the second buffer unit 114 and the header analysis is performed.

Therefore, even if an access to the first storage unit 121 or the second storage unit 122 delays to prevent a received frame from being processed in time, the frame restraining unit 113 and the second buffer unit 114 appropriately buffers the received frame. This allows minimizing discarded received frames.

In the above-described embodiment, the frame restraining unit 113 restrains the second buffer unit 114 from outputting when a limit number of connection information write operations suspended by the connection information write suspending unit 109 is reached, or when a limit number of write locations held by the write location holding unit 112 is reached. Alternatively, only one of these limit numbers may be monitored to restrain the second buffer unit 114 from outputting.

Restraining the second buffer unit 114 from outputting can cause received frames to overflow the second buffer unit 114. In this case, the overflowing received frames may be discarded.

The present invention is not limited to what has been described in the above embodiments but may be embodied with its elements modified in practice without departing from the spirit thereof. Also, various aspects of the present invention may be made in appropriate combinations of elements disclosed in the above embodiments. For example, some elements may be removed from all the elements set forth in the embodiments. Further, elements from different embodiments may be appropriately combined.

At least part of the data receiving apparatus described in the above embodiments may be implemented in either hardware or software. When implemented in software, a program that realizes at least part of functions of the data receiving apparatus may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the data receiving apparatus may be distributed through a communication line (including wireless communications) such as the Internet. Further, the program may be encrypted, modulated, or compressed to be distributed through a wired line or wireless line such as the Internet or to be distributed by storing the program on a recording medium.

What is claimed is:

1. A data receiving apparatus that receives a frame over a network, the frame including a header and a data portion, comprising:
a first storage unit that stores the data portions of frames;
a second storage unit that stores connection information, the connection information indicating a write location in the first storage unit for the data portion corresponding to a source of a received frame;
a network interface unit that inputs a first received frame;
a header analyzing unit that analyzes a header of the first received frame and outputs first header information indicating a source of the first received frame;
a checksum judging unit that calculates a checksum of the first received frame, and upon completion of the calculation, judges "pass" or "fail" for the checksum and outputs a judgment result;
a first buffer unit that stores a data portion of the first received frame for which the checksum judging unit has calculated the checksum;
a connection information reading unit that reads the connection information corresponding to the first header information from the second storage unit;
a write location identifying unit that identifies a write location in the first storage unit for the data portion of the first received frame based on the connection information read by the connection information reading unit;

a data writing unit that reads the data portion from the first buffer unit and starts writing the read data portion to the write location in the first storage unit identified by the write location identifying unit before the checksum of the first received frame is judged; and a connection information writing unit that generates an updated connection information based on the first header information and, if the judgment result is "pass," writes the updated connection information to the second storage unit while the data writing unit is writing to the first storage unit.

2. The apparatus according to claim 1, wherein the connection information writing unit does not write the updated connection information to the second storage unit if the judgment result is "fail."

3. The apparatus according to claim 1, further comprising a connection information write suspending unit that, if the checksum judging unit completes the calculation of the checksum before the connection information reading unit completes the reading and if the judgment result is "pass," suspends the writing of the updated connection information by the connection information writing unit until the connection information reading unit completes the reading, and that causes the connection information writing unit to start writing upon completion of the reading by the connection information reading unit.

4. The apparatus according to claim 1, further comprising a header information holding unit capable of holding the first header information and second header information obtained by analyzing a header of a second received frame, the second received frame being a received frame that follows the first received frame, wherein the header analyzing unit analyzes a header of the second received frame and causes the header information holding unit to hold the second header information while the connection information writing unit is updating the connection information based on the first header information and writing the updated connection information to the second storage unit.

5. The apparatus according to claim 4, further comprising a connection information read suspending unit that, if the header analyzing unit completes the analysis of the header of the second received frame before the connection information writing unit completes the writing, suspends the searching for and reading of the connection information corresponding to the second header information by the connection information reading unit until the connection information writing unit completes the writing, and that causes the connection information reading unit to start searching and reading upon completion of the writing by the connection information writing unit.

6. The apparatus according to claim 1, wherein the network interface unit inputs a second received frame after the connection information writing unit completes the writing of the updated connection information, before the data writing unit completes the writing of the data portion of the first received frame, the second received frame being a received frame that follows the first received frame, and the header analyzing unit analyzes a header of the second received frame while the data writing unit is writing the data portion of the first received frame.

7. The apparatus according to claim 6, wherein
the header analyzing unit completes the analysis of the header of the second received frame and outputs second header information before the data writing unit completes the writing of the data portion of the first received frame, and the connection information reading unit starts searching for the connection information corresponding to the second header information while the data writing unit is writing the data portion of the first received frame.

8. The apparatus according to claim 6, wherein the checksum judging unit starts calculating a checksum of the second received frame while the data writing unit is writing the data portion of the first received frame.

9. The apparatus according to claim 1, further comprising a write location holding unit that holds the write location identified by the write location identifying unit, wherein while the data writing unit is writing the data of the first received frame, the connection information writing unit completes the writing, the network interface unit inputs a second received frame, the second received frame being a received frame that follows the first received frame, the header analyzing unit analyzes a header of the second received frame and outputs second header information, the checksum judging unit calculates a checksum of the second received frame, the first buffer unit stores data for which the checksum judging unit has calculated the checksum out of a data portion of the second received frame, the connection information reading unit reads the connection information corresponding to the second header information from the second storage unit, the write location identifying unit identifies a write location for the data portion of the second received frame based on the second header information and the connection information corresponding to the second header information and causes the write location holding unit to hold the write location, and upon completion of the writing of the data of the first received frame, the data writing unit checks that the write location for the data portion of the second received frame is held in the write location holding unit, reads the data of the second received frame stored in the first buffer unit, and starts writing the read data to the write location in the first storage unit held in the write location holding unit.

10. The apparatus according to claim 9, further comprising:

a second buffer unit that stores a received frame input by the network interface unit and outputs the received frame to the header analyzing unit, the checksum judging unit, and the first buffer unit;

a connection information write suspending unit that, if the checksum judging unit completes the calculation of the checksum before the connection information reading unit completes the reading and if the judgment result is "pass," suspends the writing of the updated connection information by the connection information writing unit until the connection information reading unit completes the reading, and causes the connection information writing unit to start writing upon completion of the reading by the connection information reading unit; and a frame restraining unit that restrains the second buffer unit from outputting a new received frame when the write location holding unit is holding a write location or when the connection information write suspending unit is suspending a write operation of the connection information writing unit.

11. The apparatus according to claim 10, wherein the frame restraining unit restrains the second buffer unit from outputting a new received frame when the number of write locations held by the write location holding unit or the number of write operations of the connection information writing unit suspended by the connection information write suspending unit reaches a predetermined number.

12. A data receiving method for receiving frames over a network, comprising:

inputting a received frame;

analyzing a header of the received frame and generating header information indicating a source of the received frame;

calculating a checksum of the received frame and judging "pass" or "fail;"

storing, in a first buffer unit, a data portion of the received frame for which the checksum has been calculated;

reading connection information corresponding to the header information from a second storage unit that stores the connection information, the connection information indicating a write location in a first storage unit for the data portion corresponding to a source of the received frame;

identifying a write location in the first storage unit for the data portion of the received frame based on the read connection information;

reading the data stored in the first buffer unit and starting writing the read data to the identified write location in the first storage unit before the checksum of the received frame is judged; and updating the connection information based on the header information and, if the judgment result is "pass," writing the updated connection information to the second storage unit during the writing to the first storage unit.

13. A computer-readable recording media having recorded therein a data receiving program for receiving frames over a network which causes computer to execute:

a step of inputting a received frame;

a step of analyzing a header of the received frame and generating header information indicating a source of the received frame;

a step of calculating a checksum of the received frame and judging "pass" or "fail;"

a step of storing, in a first buffer unit, a data portion of the received frame for which the checksum has been calculated;

a step of reading connection information corresponding to the header information from a second storage unit that stores the connection information, the connection information indicating a write location in a first storage unit for the data portion corresponding to a source of the received frame;

a step of identifying a write location in the first storage unit for the data portion of the received frame based on the read connection information;

a step of reading the data stored in the first buffer unit and starting writing the read data to the identified write location in the first storage unit before the checksum of the received frame is judged; and a step of updating the connection information based on the header information and, if the judgment result is "pass," writing the updated connection information to the second storage unit during the writing to the first storage unit.

* * * * *